United States Patent
Walker et al.

(10) Patent No.: US 8,894,494 B2
(45) Date of Patent: Nov. 25, 2014

(54) SYSTEM FOR REMOTE GAME ACCESS

(71) Applicant: Spawn Labs, Inc., West Chester, PA (US)

(72) Inventors: Peter Anthony Walker, Cedar Park, TX (US); Oswald Anthony Becca, Round Rock, TX (US)

(73) Assignee: Elbo, Inc., Grapevine, TX (US)

( * ) Notice: Subject to any disclaimer, the term of this patent is extended or adjusted under 35 U.S.C. 154(b) by 0 days.

(21) Appl. No.: 14/049,986

(22) Filed: Oct. 9, 2013

(65) Prior Publication Data

US 2014/0038713 A1 Feb. 6, 2014

Related U.S. Application Data

(63) Continuation of application No. 12/925,651, filed on Oct. 26, 2010, now Pat. No. 8,568,238, which is a continuation of application No. 11/761,168, filed on Jun. 11, 2007, now Pat. No. 7,841,946.

(60) Provisional application No. 60/806,233, filed on Jun. 29, 2006.

(51) Int. Cl.
  *A63F 9/00* (2006.01)
  *A63F 13/00* (2014.01)
  *A63F 13/30* (2014.01)

(52) U.S. Cl.
  CPC ............... *A63F 13/00* (2013.01); *A63F 13/12* (2013.01); *A63F 2300/406* (2013.01); *A63F 2300/407* (2013.01); *A63F 2300/409* (2013.01); *A63F 2300/513* (2013.01); *A63F 2300/538* (2013.01); *A63F 2300/6045* (2013.01)
  USPC ............................................................. 463/42

(58) Field of Classification Search
  CPC ............ A63F 2300/10; A63F 2300/30; A63F 2300/302; A63F 2300/401; A63F 2300/402; A63F 2300/406; A63F 2300/407; A63F 2300/50; A63F 2300/561; A63F 2300/564; A63F 2300/60; A63F 2300/6009; A63F 2300/6063; A63F 2300/63

USPC ............ 463/42, 1, 9–13, 16, 22, 25; 273/274, 273/138.1, 139, 292–294, 297, 303, 306, 273/307, 308; 434/192; 709/217–219
See application file for complete search history.

(56) References Cited

U.S. PATENT DOCUMENTS

| | | |
|---|---|---|
| 5,558,339 A | 9/1996 | Perlman |
| 5,586,257 A | 12/1996 | Perlman |

(Continued)

OTHER PUBLICATIONS

Youtube—How to get started on Xbox Live https://www.youtube.com/watch?v=Lz_poqdtVnM Uploaded by videojugtechnology Uploaded Apr. 6, 2011.*

(Continued)

*Primary Examiner* — Damon Pierce
*Assistant Examiner* — Jeffrey Wong
(74) *Attorney, Agent, or Firm* — Knobbe, Martens, Olson & Bear LLP

(57) ABSTRACT

A system for allowing a user to remotely access a game includes: a game console; a remote console client configured to receive a game control signal; and a remote console server. The remote console server includes an audio and video encoder configured to receive an audio output and a video output from the game console and to convert the audio output and the video output to a network packet. The remote console server also includes: a game controller emulation unit and a network interface configured to send and receive the network packet. The game controller emulation unit is configured to receive a game controller signal from the game console and to send the game controller signal to the remote console client and to receive a game controller input from the remote console client and send the game controller input to the game console.

18 Claims, 13 Drawing Sheets

(56) References Cited

U.S. PATENT DOCUMENTS

| | | |
|---|---|---|
| 5,779,548 A | 7/1998 | Asai et al. |
| 5,779,549 A | 7/1998 | Walker et al. |
| 5,890,963 A | 4/1999 | Yen |
| 5,956,485 A | 9/1999 | Perlman |
| 6,025,801 A | 2/2000 | Beitel |
| 6,026,079 A | 2/2000 | Perlman |
| 6,029,046 A | 2/2000 | Khan et al. |
| 6,224,486 B1 | 5/2001 | Walker et al. |
| 6,315,668 B1 | 11/2001 | Metke et al. |
| 6,343,990 B1 | 2/2002 | Rasmussen et al. |
| 6,409,602 B1 | 6/2002 | Wiltshire et al. |
| 6,425,828 B2 | 7/2002 | Walker et al. |
| 6,468,160 B2 | 10/2002 | Eliott |
| 6,475,090 B2 | 11/2002 | Roelofs |
| 6,557,041 B2 | 4/2003 | Mallart |
| 6,665,872 B1 | 12/2003 | Krishnamurthy et al. |
| 6,716,102 B2 | 4/2004 | Whitten et al. |
| 6,810,528 B1 | 10/2004 | Chatani |
| 6,817,947 B2 | 11/2004 | Tanskanen |
| 6,878,067 B2 | 4/2005 | Blanco |
| 6,884,171 B2 | 4/2005 | Eck et al. |
| 6,908,389 B1 | 6/2005 | Puskala |
| 6,917,984 B1 | 7/2005 | Tan |
| 6,918,113 B2 | 7/2005 | Patel et al. |
| 6,959,320 B2 | 10/2005 | Shah et al. |
| 6,981,918 B2 | 1/2006 | Blanco |
| 7,031,473 B2 | 4/2006 | Morais et al. |
| 7,043,524 B2 | 5/2006 | Shah et al. |
| 7,062,567 B2 | 6/2006 | Benitez et al. |
| 7,090,582 B2 | 8/2006 | Danieli et al. |
| 7,189,161 B1 | 3/2007 | Wiltshire et al. |
| 7,209,874 B2 | 4/2007 | Salmonsen |
| 7,215,660 B2 | 5/2007 | Perlman |
| 7,218,739 B2 | 5/2007 | Multerer et al. |
| 7,266,509 B2 | 9/2007 | Koenig |
| 7,285,047 B2 | 10/2007 | Gelb et al. |
| 7,288,028 B2 | 10/2007 | Rodriquez et al. |
| 7,297,062 B2 | 11/2007 | Gatto et al. |
| 7,311,598 B2 | 12/2007 | Kaminkow et al. |
| 7,311,608 B1 | 12/2007 | Danieli et al. |
| 7,354,345 B2 | 4/2008 | Bortnik et al. |
| 7,458,894 B2 | 12/2008 | Danieli et al. |
| 7,471,665 B2 | 12/2008 | Perlman |
| 7,493,078 B2 | 2/2009 | Perlman |
| 7,500,916 B2 | 3/2009 | Lieberman et al. |
| 7,512,235 B2 | 3/2009 | Multerer et al. |
| 7,558,525 B2 | 7/2009 | Perlman |
| 7,559,834 B1 | 7/2009 | York |
| 7,567,293 B2 | 7/2009 | Perlman et al. |
| 7,567,527 B2 | 7/2009 | Perlman |
| 7,584,154 B1 | 9/2009 | Chen et al. |
| 7,590,084 B2 | 9/2009 | Perlman |
| 7,593,361 B2 | 9/2009 | Perlman |
| 7,605,861 B2 | 10/2009 | LaSalle et al. |
| 7,628,702 B2 | 12/2009 | Scallie |
| 7,633,521 B2 | 12/2009 | Perlman et al. |
| 7,663,045 B2 | 2/2010 | Schmidt et al. |
| 7,667,767 B2 | 2/2010 | Perlman |
| 7,670,220 B2 | 3/2010 | Chudley et al. |
| 7,684,752 B2 | 3/2010 | Perlman |
| 7,715,336 B2 | 5/2010 | Perlman |
| 7,736,231 B2 | 6/2010 | Evans et al. |
| 7,762,885 B2 | 7/2010 | Kelly et al. |
| 7,765,401 B2 | 7/2010 | Multerer et al. |
| 7,771,280 B2 | 8/2010 | Yoshino et al. |
| 7,785,197 B2 | 8/2010 | Smith |
| 7,789,757 B2 | 9/2010 | Gemelos et al. |
| 7,794,325 B2 | 9/2010 | Hawkins et al. |
| 7,803,048 B2 | 9/2010 | Tilston et al. |
| 7,811,174 B2 | 10/2010 | Whitten et al. |
| 7,818,568 B2 | 10/2010 | Multerer et al. |
| 7,824,268 B2 | 11/2010 | Harvey et al. |
| 7,837,558 B2 | 11/2010 | Yoshino et al. |
| 7,837,560 B2 | 11/2010 | Wiltshire et al. |
| 7,841,946 B2 | 11/2010 | Walker et al. |
| 7,846,025 B2 | 12/2010 | Whitten et al. |
| 7,849,491 B2 | 12/2010 | Perlman |
| 7,878,907 B2 | 2/2011 | Davis et al. |
| 7,878,908 B2 | 2/2011 | Sloate et al. |
| 7,887,418 B2 | 2/2011 | Kaminagayoshi |
| 7,887,420 B2 | 2/2011 | Nguyen et al. |
| 7,916,147 B2 | 3/2011 | Clemie et al. |
| 7,991,890 B2 | 8/2011 | Schmidt et al. |
| 8,002,617 B1 | 8/2011 | Uskela et al. |
| 8,038,535 B2 | 10/2011 | Jensen |
| 8,118,676 B2 | 2/2012 | Craig et al. |
| 2001/0016519 A1 | 8/2001 | Choe |
| 2001/0035859 A1 | 11/2001 | Kiser et al. |
| 2002/0022516 A1 | 2/2002 | Forden |
| 2002/0022521 A1 | 2/2002 | Idaka |
| 2002/0045484 A1 | 4/2002 | Eck et al. |
| 2002/0086730 A1 | 7/2002 | Nakai |
| 2002/0151363 A1 | 10/2002 | Letovsky et al. |
| 2002/0155891 A1 | 10/2002 | Okada et al. |
| 2003/0004882 A1 | 1/2003 | Holler et al. |
| 2003/0064808 A1 | 4/2003 | Hecht et al. |
| 2004/0038740 A1 | 2/2004 | Muir |
| 2004/0109031 A1 | 6/2004 | Deaton et al. |
| 2004/0110468 A1 | 6/2004 | Perlman |
| 2004/0127272 A1 | 7/2004 | Park et al. |
| 2004/0246936 A1 | 12/2004 | Perlman |
| 2004/0266529 A1 | 12/2004 | Chatani |
| 2005/0021159 A1 | 1/2005 | Ogawa |
| 2005/0070359 A1 | 3/2005 | Rodriquez et al. |
| 2005/0073968 A1 | 4/2005 | Perlman |
| 2005/0176452 A1 | 8/2005 | Perlman |
| 2005/0231469 A1 | 10/2005 | Wittig |
| 2006/0055699 A1 | 3/2006 | Perlman et al. |
| 2006/0055706 A1 | 3/2006 | Perlman et al. |
| 2006/0068911 A1 | 3/2006 | Pirich et al. |
| 2006/0112176 A1 | 5/2006 | Liu et al. |
| 2007/0021213 A1 | 1/2007 | Foe et al. |
| 2007/0091178 A1 | 4/2007 | Cotter et al. |
| 2007/0173325 A1 | 7/2007 | Shaw et al. |
| 2007/0184903 A1 | 8/2007 | Liu et al. |
| 2007/0238528 A1 | 10/2007 | Harris et al. |
| 2008/0119290 A1 | 5/2008 | Lee et al. |
| 2008/0125226 A1 | 5/2008 | Emmerson |
| 2008/0178298 A1 | 7/2008 | Arai et al. |
| 2008/0267069 A1 | 10/2008 | Thielman et al. |
| 2012/0157205 A9 | 6/2012 | Danieli et al. |
| 2012/0242590 A1 | 9/2012 | Baccichet et al. |

OTHER PUBLICATIONS

IGN—The Xbox Live FAQ http://www.ign.com/articles/2002/08/16/the-xbox-live-faq by Aaron Boulding Aug. 12, 2002.*

IGN—Xbox 360 Launch Guide: Beyond the Launch http://www.ign.com/articles/2005/12/01/xbox-360-launch-guide-beyond-the-launch by Douglass C. Perry Nov. 30, 2005.*

GameSpy—ARCADE for the Internet Subscription, 1996-2005.

Henderson, Tristan, "Latency and User Behaviour on a Multiplayer Game Server", 2001, Springer-Verlag.

Henderson, Tristan, "Observations on game server discovery mechanisms", Apr. 17, 2002, NetGames 2002.

Steam Subscription Service, 2006 Valve Corporation.

Verizon Open Whole New Virtual World of Online Games, Sep. 13, 2005.

"Zoo Tycoon", Nov. 25, 2001, available at <http://web.archive.org/web/20011226173527/www.pibweb.com/review/zooty-coon.html>.

Product updates regarding XBOX and XBOX Live, http://www.engadget.com/tag/xbox+live+dashboard+update/ (2009).

* cited by examiner

SYSTEM FOR REMOTE GAME ACCESS

CROSS-REFERENCE TO RELATED APPLICATIONS

This application is a continuation application of U.S. patent application Ser. No. 12/925,651, filed on Oct. 26, 2010, and entitled "SYSTEM FOR REMOTE GAME ACCESS," which is a continuation application U.S. patent application Ser. No. 11/761,168, filed on Jun. 11, 2007, and entitled "SYSTEM FOR REMOTE GAME ACCESS," now U.S. Pat. No. 7,841,946, which in turn claims priority to U.S. Provisional Patent Application No. 60/806,233, filed Jun. 29, 2006 and entitled "System for Remote Game Access," the content of which are hereby incorporated by reference in its entirety

BACKGROUND OF THE INVENTION

Typical game consoles are designed to output audio and video signals to a display such as a television system. Users generally play console games by going physically to the console. A system that allows users to play console games from remote locations over a network would allow users to play a console games without physically going to the location of the game console.

SUMMARY OF THE INVENTION

Embodiments of the present invention enable users to play console games from remote locations in real-time, over a network. Embodiments also provide for a system to allow users to determine which game consoles are available and provide a system to manage the access and accounting for multiple users, thereby creating a virtual arcade.

Embodiments of the present invention bring the game console to the user as opposed to the current static configuration where the user must go to the console. Embodiments of the present invention are configured to allow remote access to various types of game consoles and are not limited to systems that are strictly designed for playing games. Game consoles include standard computers that are capable of performing many other functions in addition to allowing the user to play games. Embodiments comprise a remote console server (RCS), which further comprises a console virtualization engine (CVE). In certain embodiments, the RCS comprises an audio and video encoder that digitizes and compresses the audio and video output of a game console and sends them as TCP/IP network packets to a remote console client (RCC). The RCS may also comprise a game controller emulation (GME) unit that sends game controller signals from the console to the RCC and receives game controller input from the RCC and passes it to the game console. In addition, in certain embodiments the RCS may comprise a memory card emulation (MCE) unit that emulates the memory card of the game console.

The memory card of the game console is used to save user game configuration for games played on the console. By emulating this function, the RCS allows user game settings to be uploaded from the game console for storing in a repository. The emulation unit also allows user game setting information to be downloaded to the RCS so that it can be used by the game console. This allows a user to play games on any virtualized console, as the user's game configurations are enabled to migrate to different units. Thus, the RCS preserves the continuity of game playing experience for the user, enabling the impression of playing from the same game console unit.

DETAILED DESCRIPTION OF THE PREFERRED EMBODIMENT

Figure 1:
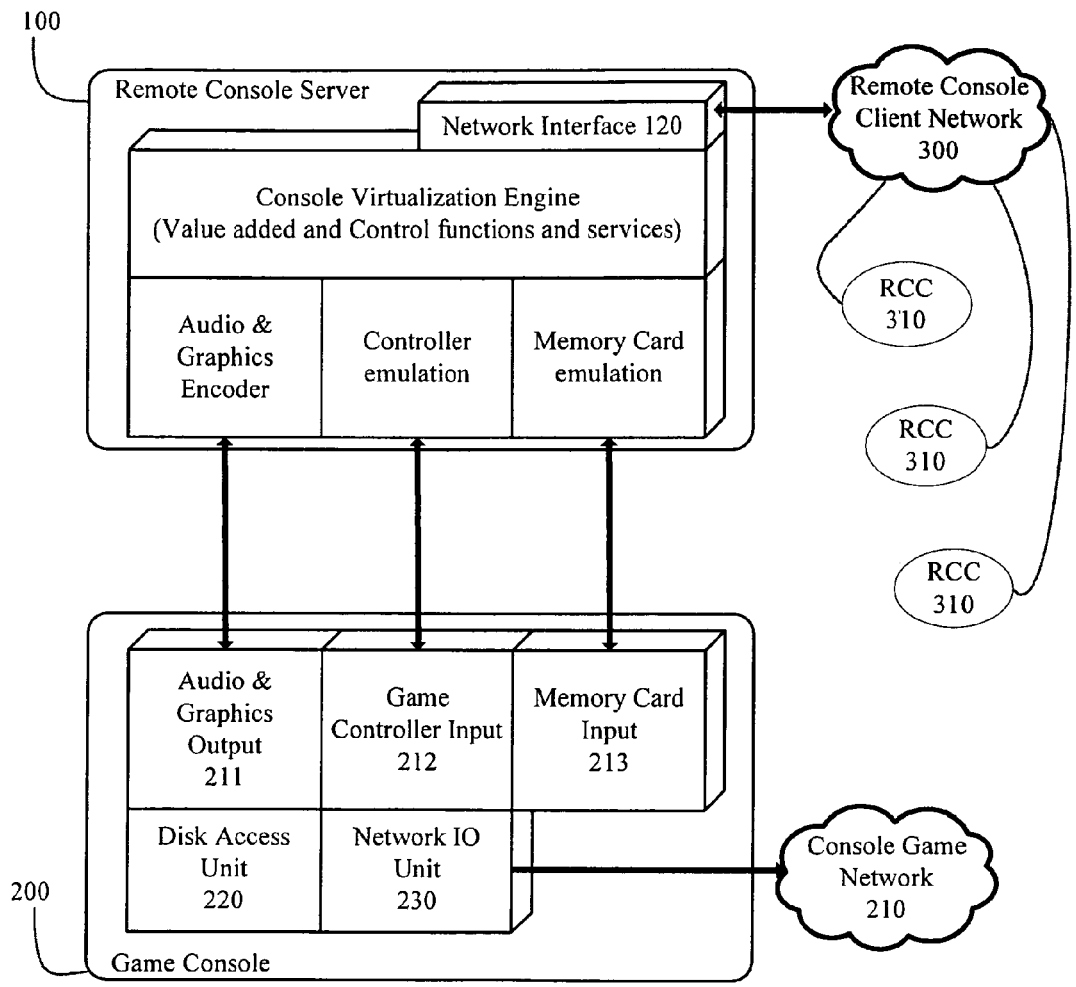
FIG. 1 is a schematic of a remote console server and a game console of one embodiment of the present invention.

Referring initially to FIGS. 1-4, an RCS 100 is configured to communicate with a game console 200 and a remote console client (RCC) network 300. The physical connection between the game console 200 and RCS 100 can be wired or wireless. RCS 100 further comprises a console virtualization engine (CVE) 110 and a network interface 120. CVE 110 further comprises an audio and graphics/video encoder 111, a controller emulation unit 112, and a memory card emulation unit 113. Game console 200 generates an audio and graphics output 211 and receives a game controller input 212 and a memory card input 213. Game console 200 further comprises a disk access unit 220 and a network 10 unit 230 for accessing a console game network 210. RCC network 300 comprises at least one individual RCC 310. In certain embodiments, the various components of the system are connected to the internet via a local area network (LAN) 411 and router 412.

RCC 310 regenerates the signals received from audio and graphics output 211. RCC 310 also accepts game control signals from the user through a game controller 311, a keyboard 312 or a mouse 313 connected to it. Through a controller translator 314, RCC 310 further encodes and transmits these game control signals in packet 315 (shown in FIG. 3) back to RCS 100 via virtual game play session manager (VGSM) 375. RCS 100 then converts packet 315 to controller input signals 317 in controller emulation unit 112 expected by game controller input 212 of game console 200. In certain embodiments, RCS 100 is configured to receive game controller signals from the game controller input 212 and send them to RCC 310. For example, some game controllers are configured to vibrate or illuminate based on game controller signals received from game controller input 212.

Figure 3:
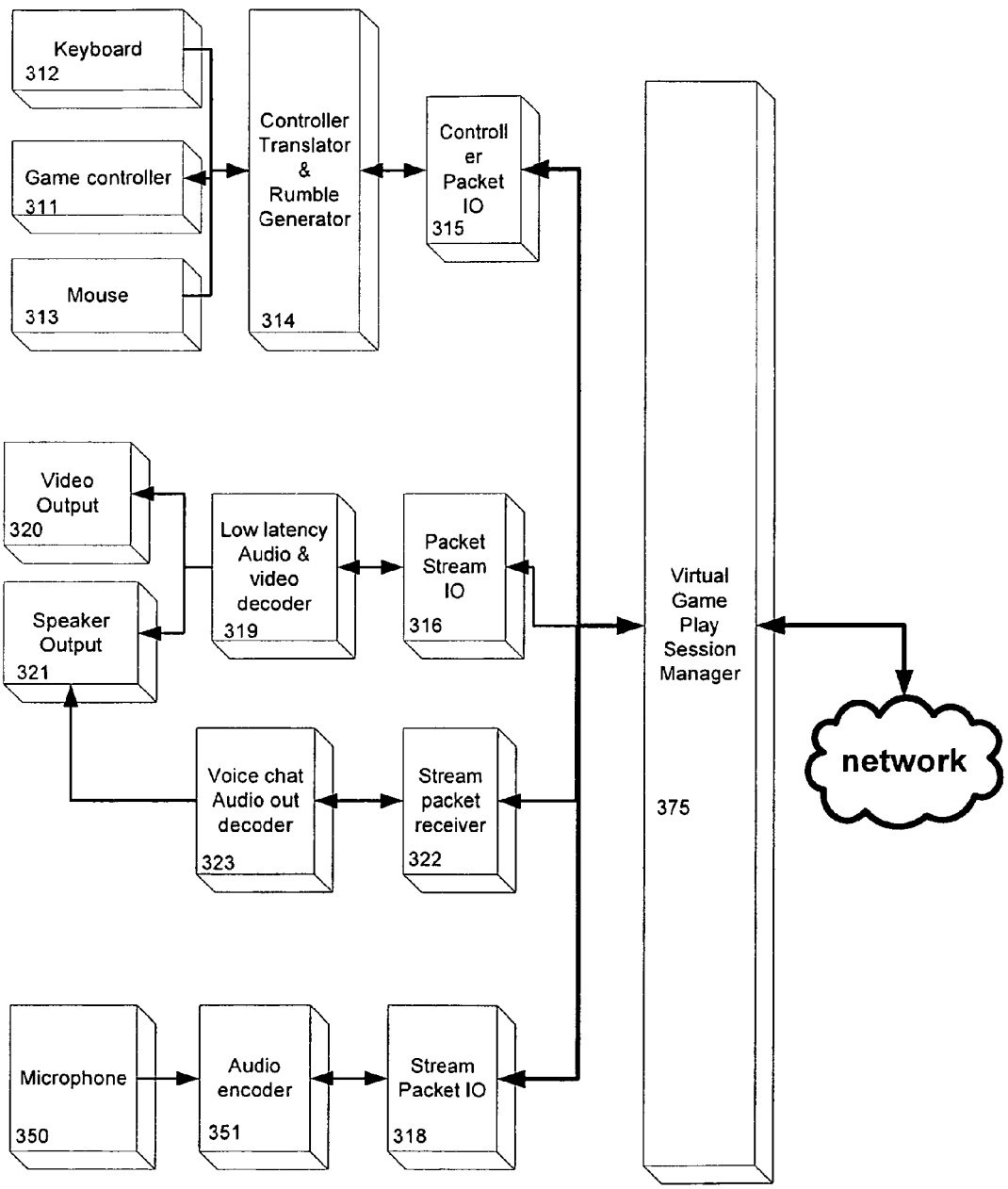
FIG. 3 is a schematic of subsystems used in a remote console client in one embodiment of the present invention.

In the embodiment shown in FIG. 3, RCC 310 also includes a microphone input 350 that passes through an audio encoder 351 and is converted to packet 318. Packet 318 is sent to RCC 310 units connected to RCS 100, thereby allowing users to have verbal interactions while playing or viewing a game on game console 200.

Audio and graphics output 211 of game console 200 is sent through the audio and graphics encoder 111 of RCS 100 to VGSM 375 of RCC 310. After VGSM converts output 211 to a packet 316, a low latency audio and video decoder 319 generates a video output 320 and an audio/speaker output 321. In certain embodiments, RCC 310 also comprises a stream packet receiver 322 that communicates with a voice chat/audio out decoder 323 that is sent to speaker output 321. Stream packet receiver 322 and voice chat/audio out decoder 323 allow multiple users to verbally communicate with one another while playing a game.

In certain embodiments, the RCS may adapt the video quality and latency to the available bandwidth by changing encoding parameters to improve users' real-time experience. The video quality and latency may be adjusted by the user or, alternatively, may be adjusted automatically by the system. Further, the RCS may adapt the video quality and latency depending on the type of images being sent to the RCC. For example, in Text Mode, the RCS can send images at slow frame rates but high resolutions. This mode may be useful when the user needs to read game text during game setup or game play. In another embodiment, the Text mode encoding may be implemented as a background process and the data may be transmitted as a sub-channel to the primary game stream. RCC users can dynamically switch between real-time interactive game stream and Text Mode views as necessary. Certain embodiments may also comprise a TV Mode, in which the RCS can send video images using higher compression, higher latency and higher quality video transmission.

In certain embodiments, RCS 100 possesses some or all of the following capabilities:
1. Identifying game controllers plugged into the user's RCC, automatically querying, and retrieving compatible controller configuration from a global server when the user initiates game play;
2. Caching controller configurations for future use;
3. Automatically loading game help information, such as the function of game pad controls in a game;
4. Adjusting to different game console controller types and game save memory emulation system; and
5. Downloading new modes as new console platforms or updates to console platforms become available.

In certain embodiments, RCC 310 possesses some or all of the following capabilities:
1. Sufficient computing power to decode and regenerate audio and video streams from RCS 100 in real-time;
2. TCP/IP network connectivity with sufficient bandwidth to accept the packet stream from RCS 100;
3. An I/O interface to accept a controller adapter that allows a game controller 311 to be connected or other I/O capabilities that are capable of generating signals that can be interpreted as game controller functions; and
4. A microphone interface to allow the user to connect microphone 350 to RCC 310.

Figure 2:
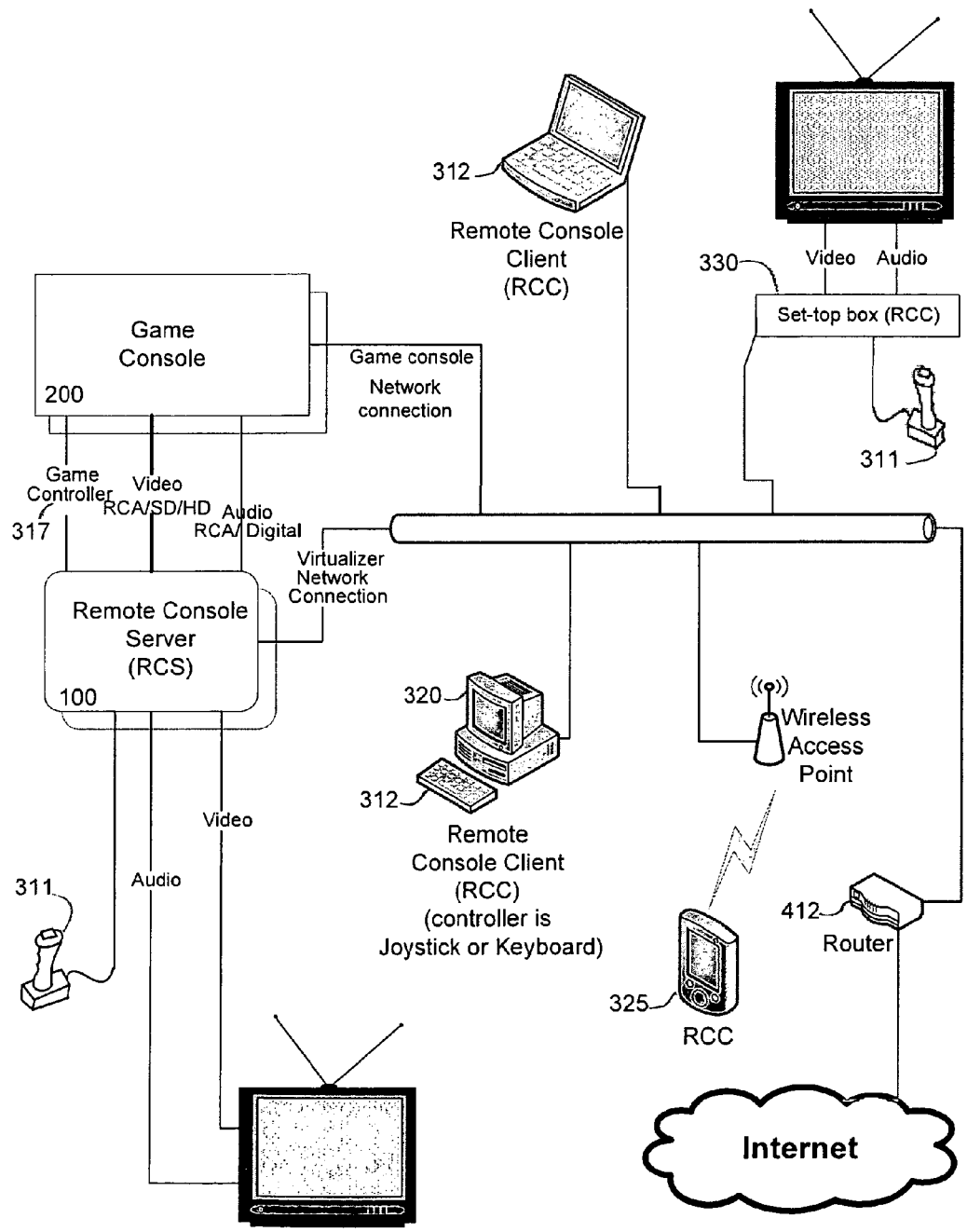
FIG. 2 is a schematic of a system in one embodiment of the present invention.

There are a wide range of devices that are known to meet these criteria. As shown in FIG. 2 for example, RCC 310 may comprise a desktop computer 315, a laptop (mobile) computer 320, a hand-held device such as a personal digital assistant (PDA) 325, or a television set top box 330. Embodiments of this disclosure are compatible with each of these platforms as well as other similar devices.

Multi-Player Capability

Software running on RCS 100 enables multiple players to share game console 200, such as is currently available in multi-controller, multiplayer games. Each RCS 100 announces its presence to other RCS 100 systems on the local network. Users may then initiate connections to available RCS 100 systems.

Each RCC 310 may be logically connected to at least one input device such as game controller 311, keyboard 312 or mouse 313. Controller inputs from each RCC 310 are forwarded to the designated input on RCS 100. An RCC 310 that can control a port on game console 200 is called "active". Additionally, RCS 100 may allow more users than the game allows as players to connect in passive or monitor-only sessions. These passive RCCs 310 receive signals from audio and graphics output 211 but no controller input is passed back to RCS 100. Both active and passive users may also communicate verbally through their RCCs. Thus, many users can view a game remotely and virtually experience the feeling of being in the same room. RCS 100 enables an active RCC 310 to hand over control of its controller to a passive RCC 310, thereby making the passive RCC 310 active and causing the active RCC 310 to become passive.

Desired Characteristics

Certain physical network criteria, such as sufficient downstream network bandwidth, are beneficial for providing an optimal remote gaming experience for users. Downstream bandwidth is the network bandwidth needed to send packets from RCS 100 to the RCC network 300. Depending on the RCC unit 310 characteristics (display size, resolution and desired audio quality), bandwidths of between 256 Kb/sec (portable) and 8 Mb/sec (high definition) are needed per user. This is within the capacity of wired and wireless local area networks, such as is typically available in a home or commercial environment. Smaller portable devices generally require less bandwidth because of the smaller display. A wireless network, for example as may exist at a hotspot can sustain many remote play sessions concurrently depending on the network and the specific device characteristics. A 54 Mb/sec wireless network at 50% efficiency could support 50 concurrent remote play users at 384 Kb/sec each. Similarly, the downstream bandwidth of broadband connections (Cable/DSL/Wireless) of 384 Kb/sec and greater is able to support at least one remote play user. RCS 100 is designed to support network bandwidth of 100 Mb/sec and higher and is therefore able to host many users.

Sufficient upstream bandwidth is also desirable to provide an optimal remote gaming experience for users. Upstream bandwidth is the bandwidth needed to transmit controller commands from RCC network 300 to RCS 100. A bandwidth of 2 Kb/sec is typically needed for this function. Additionally, voice grade audio for voice sharing typically needs about 8 Kb/sec. Thus, a total of 10 Kb/sec is generally needed per user. This is within the upstream bandwidth of typical broadband networks which generally have upstream bandwidths of 64 Kb/sec and higher. Local area wired/Wi-Fi networks typically have symmetric bandwidth.

Low network latency is also desirable to provide an optimal remote gaming experience for users. To maintain the experience that users obtain from direct play of console games, the time for packets to travel from RCS 100 to RCC 310 (latency) should be low, of the order of less than 20 milliseconds (ms). On a local area network, latencies are generally significantly lower (<2 ms). Network latencies across the Internet and wide area networks (WAN), however can vary much more significantly. This is generally so when greater geographic distances exist between the communicating parties. Embodiments of the present disclosure will enable an RCC 310 to automatically locate a RCS 100 that is hosting user-desired games that are "closest" to them (lowest latency) and thereby help ensure an optimal game experience.

Video and audio encode/decode latency is also desirable to provide an optimal remote gaming experience for users. Embodiments of the present disclosure provide RCS 100 to RCC 310 encode-decode latencies of less than 100 ms. This is within the bounds that will ensure user perception of direct play experience.

Global Servers

In certain embodiments, remote console play may benefit from the following features:
1. Users may need a unified way of locating RCS 100 and games on the network.
2. Upon locating RCS 100, a method for reserving it for exclusive use may be needed until the session is terminated.
3. An accounting method that allows for the user to access the device without requiring local re-authentication and conducts appropriate time tracking and billing.

Figure 4:
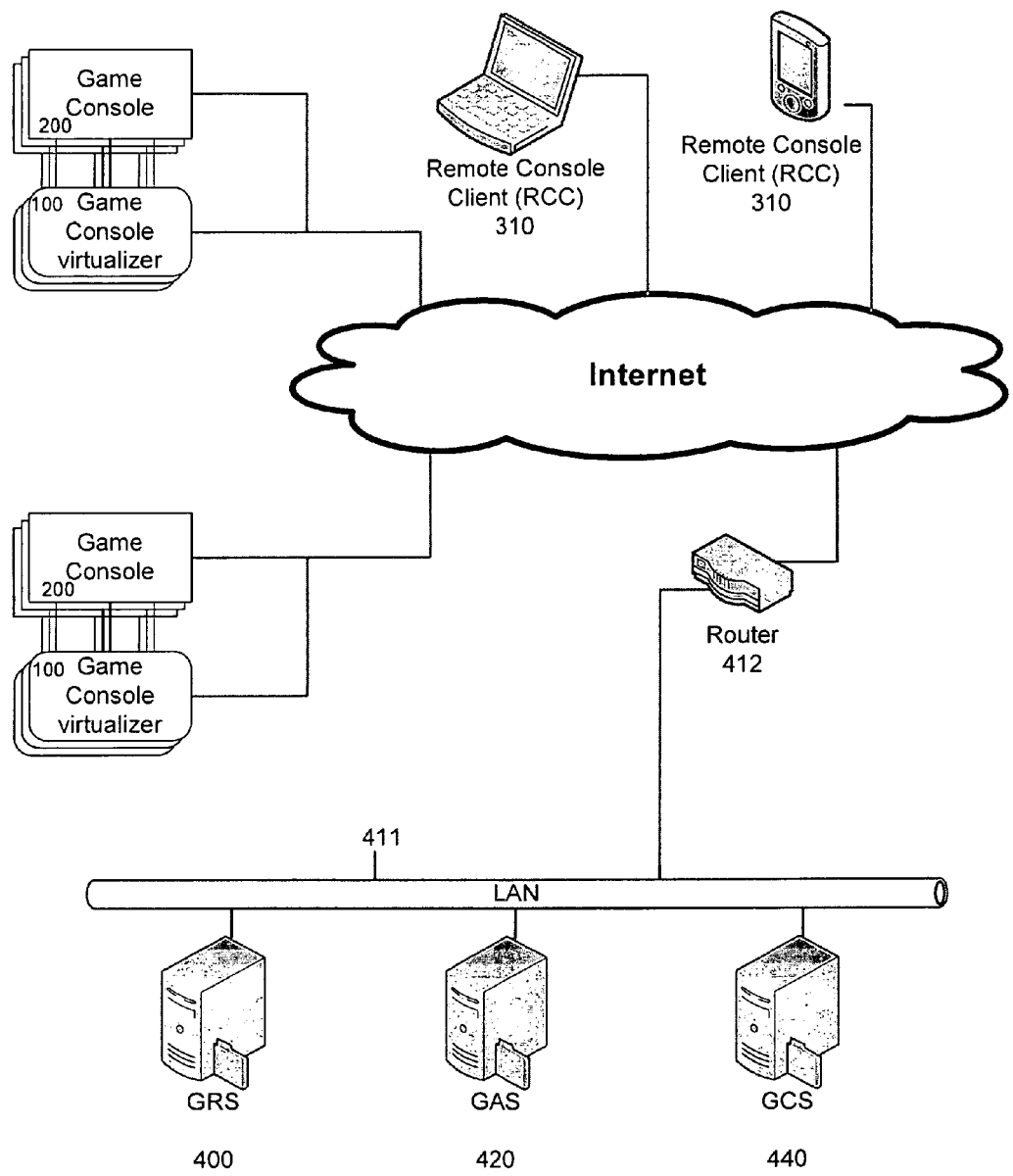
FIG. 4 is a schematic of a system in one embodiment of the present invention.

Referring now to FIG. 4, embodiments of the present disclosure comprise one or more global servers that provide these functions, enabling the distributed network of RCS 100 to be easily accessed by users and providers. The servers can be owned by a central company that charges a percentage of the fee billed to RCC 310 users who pay to access RCS 100. The central company may also profit from advertisements displayed on RCC 310.

In certain embodiments, the following 3 servers can be used to enable this service to users:
1. Global Registry Server (GRS) 400: For enabling easy discovery of available RCS 100 and games hosted by them.
2. Global Configuration Server (GCS) 420: For persistent storage of user game settings.
3. Global Authentication Server (GAS) 440: For authenticating access to RCS 100 from RCC 310.

GRS 400, GCS 420 and GAS 440 are connected to the interne via a local area network (LAN) 411 and router 412. Software on RCS 100 and RCC 310, with user input, communicates with these servers 400, 420 and 440 to ensure a user-friendly experience accessing remote play network devices and services. While GRS 400, GCS 420 and GAS 440 serve different functions within the system, in certain embodiments, all functions could be performed by one physical global server.

Global Registry Server (GRS)

In certain embodiments, each game console 200 is allowed to play a single game at an instant in time. GRS 400 will allow users to register their RCS 100 and track/monitor its availability. When RCS 100 becomes busy because a game is being played on game console 200, RCS 100 reports this to GRS 400. Similarly, RCS 100 may regularly register with the FRS 400 and report when it becomes available. RCC 310 users search GRS 400 to locate and reserve access to game consoles 200 that are accessible to them. RCS 100 owners register their servers and the games available with GRS 400 and specify who is allowed to access it. Access is defined in the context of a play cell community, subsequently described in more detail below.

Global Configuration Server (GCS)

In certain embodiments, the GCS 440 is a persistent store server that allows users to save and restore their game configuration from GCS 440 to game console 200 via attached RCS 100. When a user connects to RCS 100 to play a game, the option to download a previous game configuration is provided. Thus, as users play a given game on different physical RCC 310 units or RCS 100 units, the perception of continuity in game play is enabled.

Global Authentication Server (GAS)

In certain embodiments, GAS 420 creates and authenticates user accounts. RCC 310 users create accounts by registering on GAS 420. This allows time auditing and authentication to be done for the use of RCS 100 to play games. If a specific RCS 100 used is enabled for billing, the RCC 310 user's account may be charged and the RCS 100 owner's account may be credited. This single system view enables RCC 310 users to locate and use any available RCS 100 and authenticate only once for signing onto the service. The account creation process involves users requesting membership in play cells. An RCS 100 owner creates a play cell for the RCS 100 registered on GRS 400. RCS 100 owners can open access to their RCS 100 to other RCC 310 consumers by adding them to their play cell Community. RCC 310 users can also request access to community by contacting the owner of that play cell community.

In certain embodiments, franchise RCS 100 systems are enabled to communicate with GRS 400, GAS 420 and GCS 440 to participate in creating a single directory view of the registration, configuration and account management to users.

Play Cell Network

Figure 5:
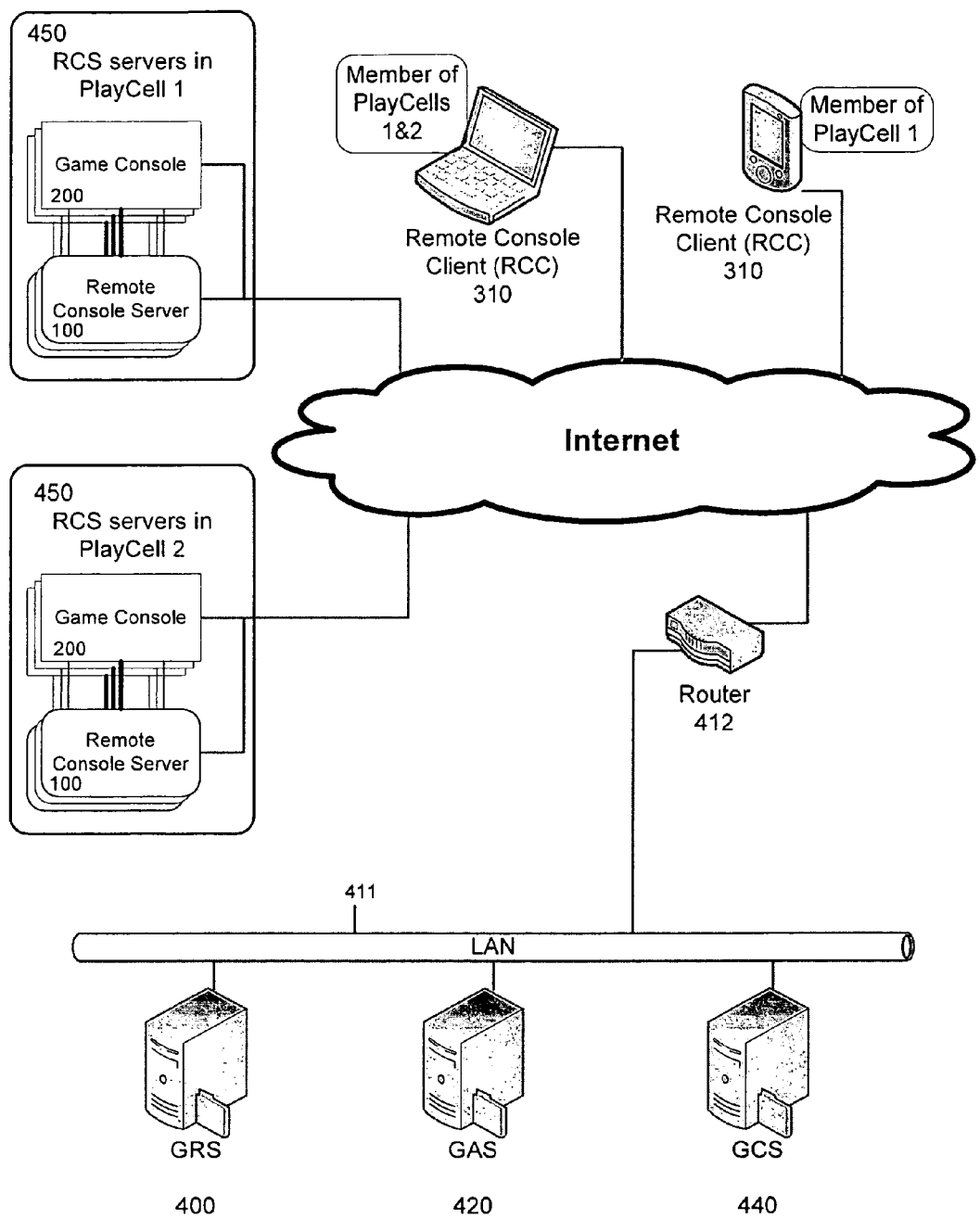
FIG. 5 is a schematic of a system in one embodiment of the present invention.

Referring now to FIG. 5, through its global servers (GRS 400, GAS 420 and GCS 440) and RCC 310 software, certain embodiments of this disclosure enable the creation of a shared community or network called a play cell 450. Play cell 450 is one or more RCS 100 that only members in that specific play cell 450 can access from their RCC 310. One method for creating play cell 450 comprises the following steps:
1. User creates an account on GAS 420.
2. User registers RCS 100 with GRS 400. This creates play cell 450 with a membership of 1, which is the owner of RCS 100. The owner of RCS 100 has management privileges over who joins/leaves his/her play cell 450. If the user already owns an existing play cell 450, GRS 400 can add RCS 100 to the existing play cell 450, as opposed to creating a new one. In certain embodiments intended for individual users, each RCS 100 is designed to support a relatively small number (for example, two) of game consoles 200 concurrently. In other embodiments intended for commercial or franchise use, RCS 100 may support a greater number (for example, ten or more) of game consoles 200.
3. The owner of play cell 450 invites others to use their RCS-enabled consoles 200 by:
   i. Adding the names of the user accounts or cells that can access his/her server's play cell 450.
   ii. Opening the play cell 450 to general use.

In certain embodiments, the RCC 310 has built in instant messaging type functions that enable users to:
1. Monitor the status of RCS 100 to determine its availability and to request access to RCS 100.
2. Notify the user when an RCS 100 become available.
3. Chat with users in their play community.
4. Coordinate the playing of multiplayer games.
5. Manage their contact list and server watch list.

In certain embodiments, users may have access to real-time multimedia streams of live game play through a global web portal system. Game console owners can also expose and manage remote access to their game consoles via this web portal.

Franchise Remote Console Server Systems

Certain embodiments enable businesses to deliver game-on-demand services for console games on their local network or via WAN. The system technology is designed for:

1. Serving a large number of consoles (for example, greater than 10);
2. User authentication and accounting; and
3. System administration and management.

These embodiments enable the creation of game-on-demand services (virtual arcades) in malls, shopping centers, hotels, Wi-Fi hot spots, etc. FIG. 5 depicts this system. Multiple RCS units can be managed and franchised as a common pool through a web portal.

In certain embodiments, messages such as advertisements can be sent to RCC 310 from either RCS 100 or from global servers. Further, users' usage patterns of games played or viewed through either a web portal or franchise location can be collected and used to target advertisements to users.

Figure 6:
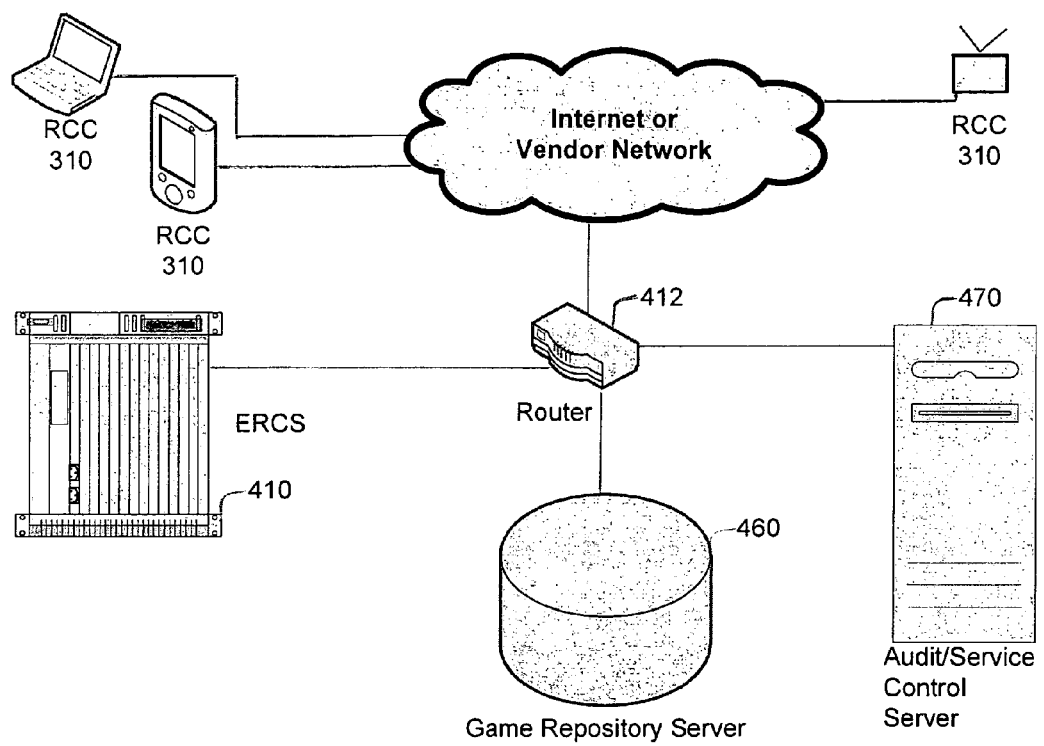
FIG. 6 is a schematic of a system in one embodiment of the present invention.
Figure 7:
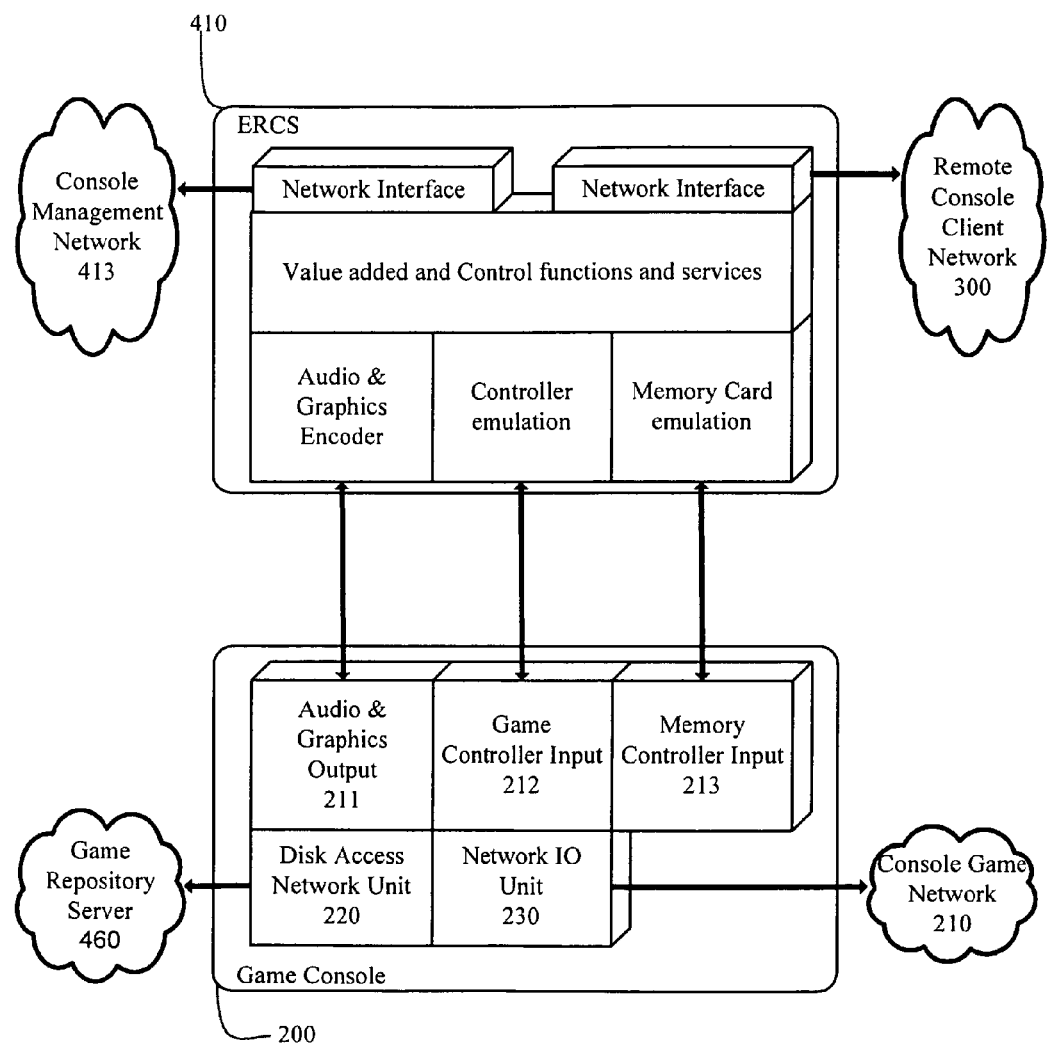
FIG. 7 is a schematic of a system in one embodiment of the present invention.

Referring now to FIGS. 6 and 7, certain embodiments of the present disclosure include highly scalable Enterprise Remote Console Servers (ERCS) 410 and distribution rights from game manufacturers that will enable businesses to provide on-demand game services. ERCS 410 comprises the ability to load games on-demand to the console from a Game Repository Server (GRS) 460 as opposed to a local disk unit. ERCS 410 also interfaces with a console management network 410 to link up to other remote console servers. An audit/service control server 470 controls the access to the on-demand games and provides record-keeping functions. Other embodiments also comprise a disk changer for game console 200. The disk changer is under the control of RCS 100 and enables the user to do remote selection of games from the library available in the disk changer.

Figure 8:
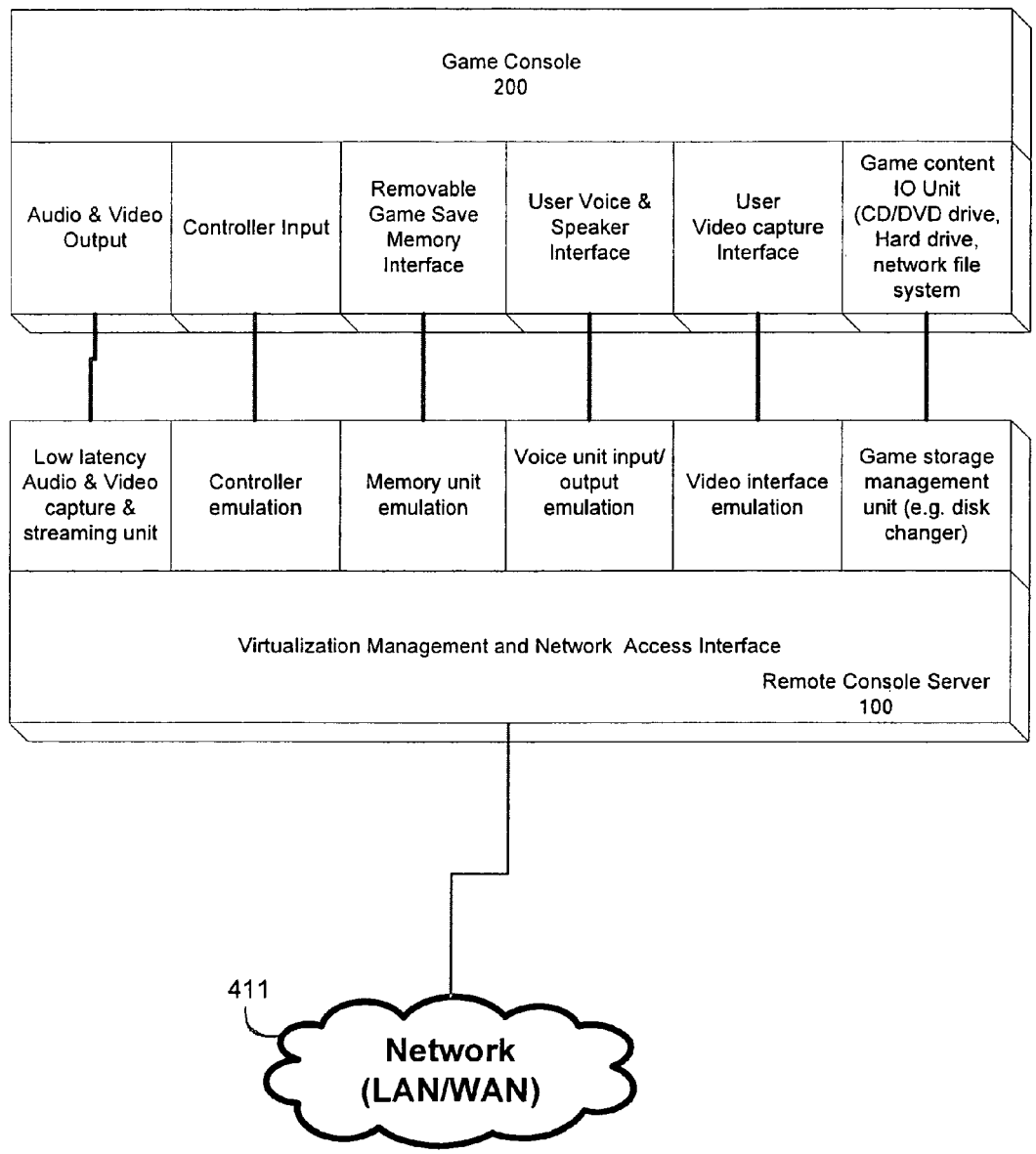
FIG. 8 is a schematic of a remote console server and a game console of one embodiment of the present invention.

Referring now to FIG. 8, an overview and summary of the interaction between game console 200 and remote console server 100 is shown for one embodiment. The individual functions shown in FIG. 8 are described above in the discussion of the various embodiments.

Figure 9A:
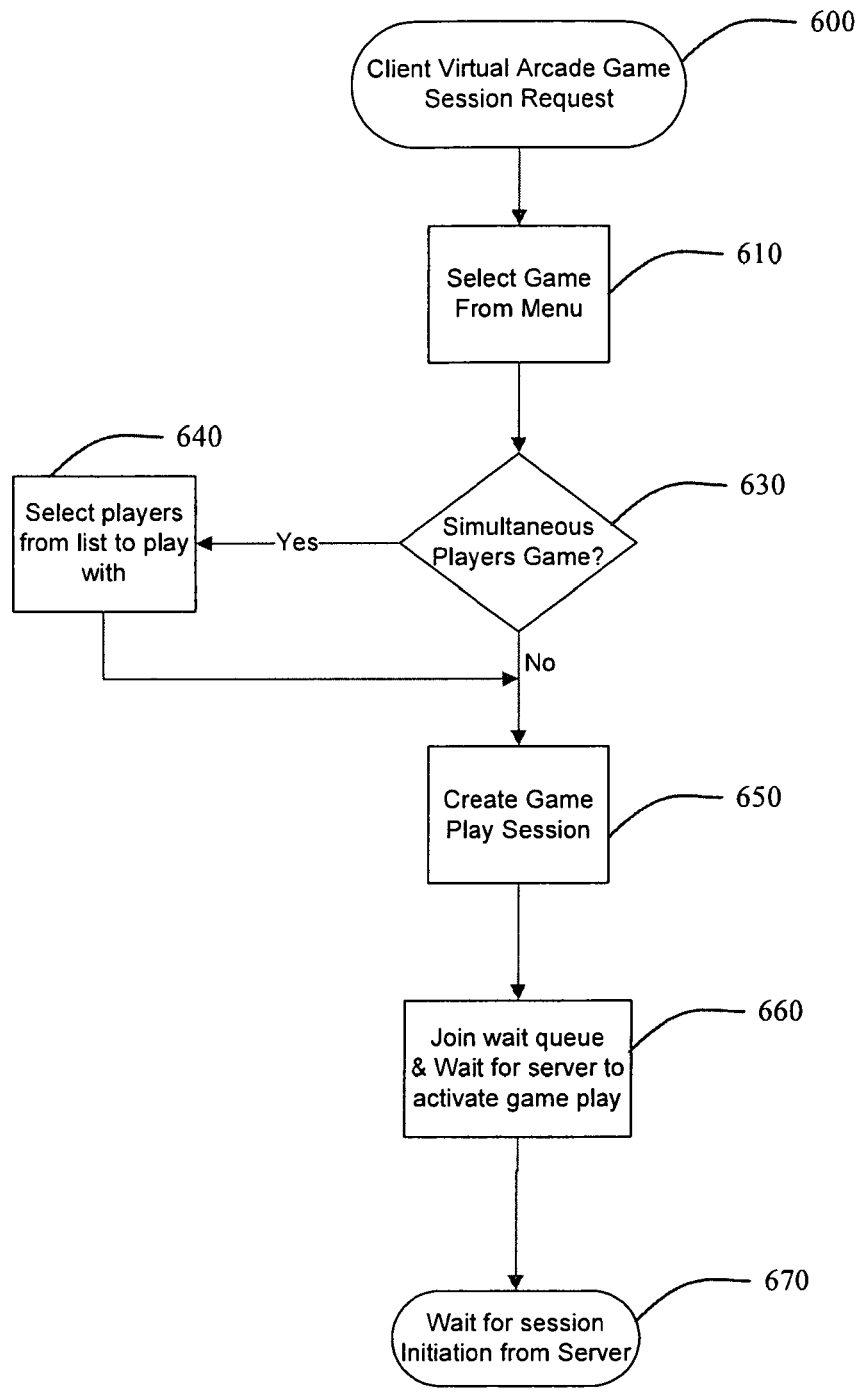
FIG. 9A is a logic flowchart for a virtual arcade session request in one embodiment of the present invention.
Figure 9B:
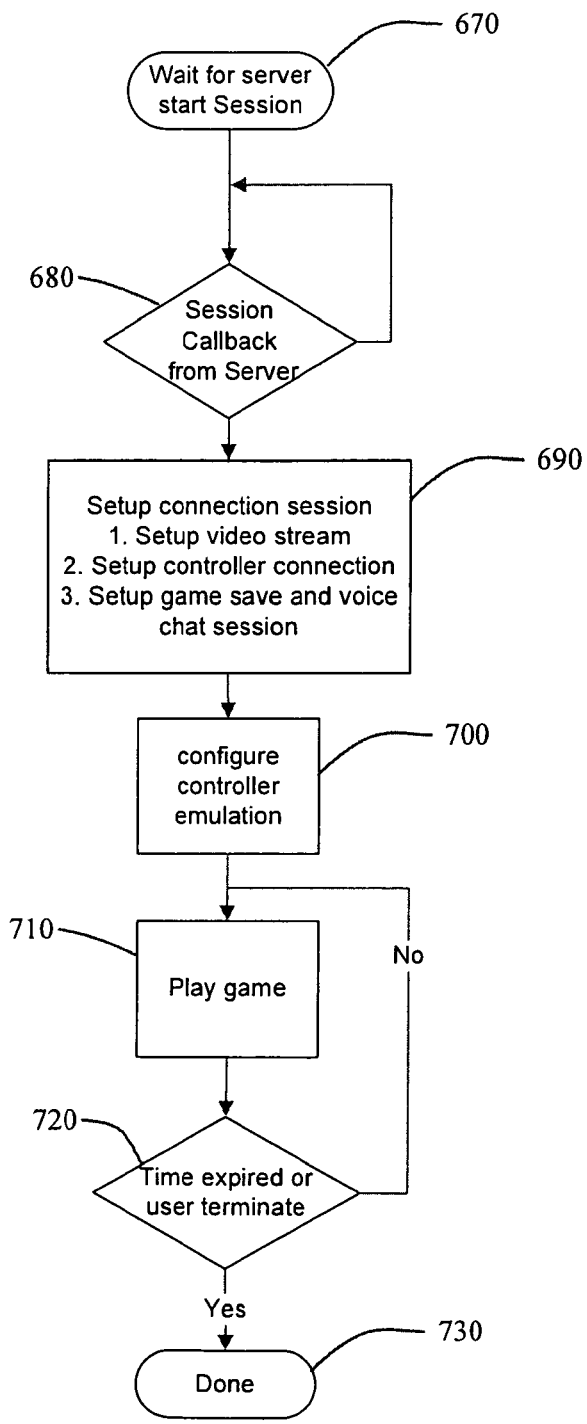
FIG. 9B is a logic flowchart for a virtual arcade session request in one embodiment of the present invention.

Referring now to FIGS. 9A and 9B, a logic flowchart of the initiation sequence used in certain embodiments is shown. As illustrated, a session request 600 allows a user to enter a game selection 610. A query 630 then evaluates whether game selection 610 is a simultaneous players game. If so, a player selection 640 is performed before a game play session 650 is created. After game play session 650 is created, the user joins a wait queue 660 and waits for a session initiation 670 via a session callback 680. After session initiation 670, a setup connection session 690 is created and the controller emulation 700 is configured. The user then plays game 710 until an expiration or termination signal 720 is generated, at which time the game completion 730 is accomplished.

Figure 10:
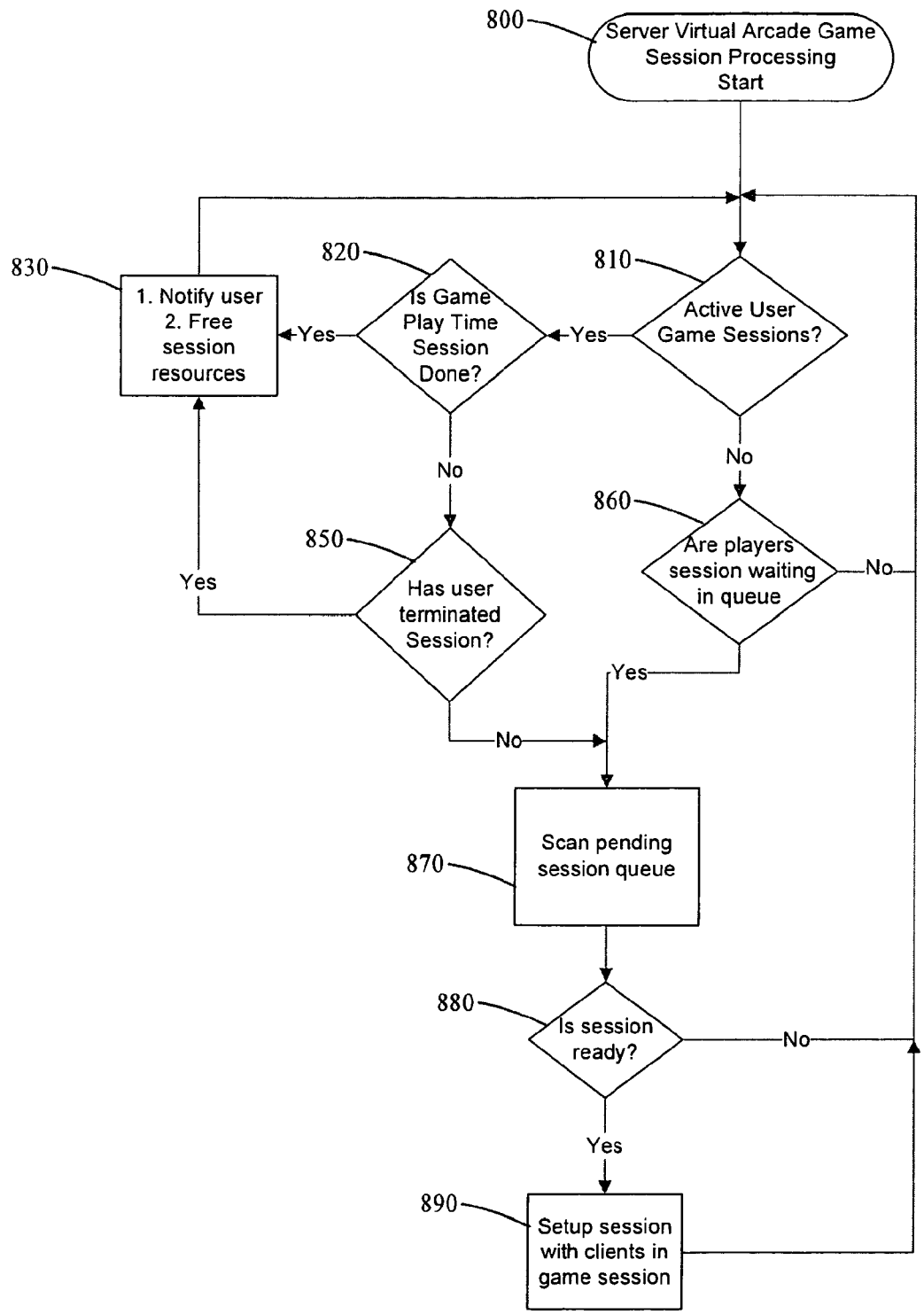
FIG. 10 is a logic flowchart for a server virtual arcade game session processing start in one embodiment of the present invention.

Referring now to FIG. 10, a logic flowchart for the session processing used in certain embodiments is shown. As illustrated, an initiation 800 of session processing leads to a query 810 of active game users. If there are no active game users, a query 860 is performed to determine if players are waiting in queue. If there are active game users, a query 820 determines if the game play time has expired. If play time has expired, a notification 830 is sent to the users and session resources are freed. If play time has not expired, a query 840 is performed to determine if the user has terminated the session. If the user has not terminated the session and there are players waiting in queue, a scan 870 is performed of the pending session queue. After scan 870, a query 880 is performed to determine if the session is ready. If the session is ready, the session 890 is then initiated.

Figure 11:
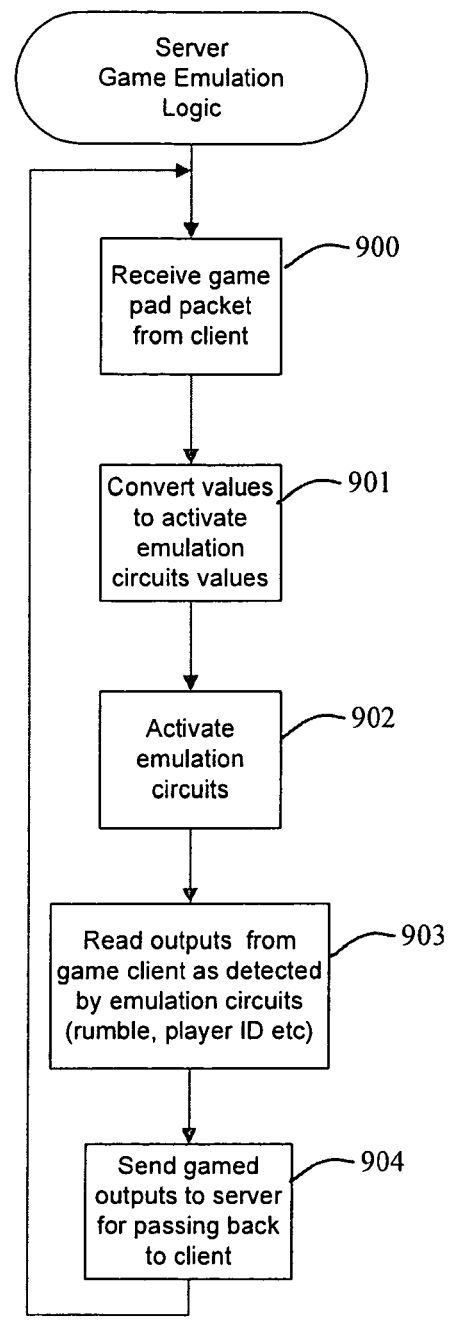
FIG. 11 is a flowchart for server game emulation logic in one embodiment of the present invention.

Referring now to FIG. 11, a logic flowchart for server game emulation logic used in certain embodiments is shown. After a receipt 900 of a game pad packet from a user, a conversion 901 is performed on the game pad packet values. After conversion 901, an activation 902 of the emulation circuits and a reading 903 of outputs from the game client is performed. Finally, a sending 904 of game outputs to the server is conducted for relaying to the user.

Figure 12:
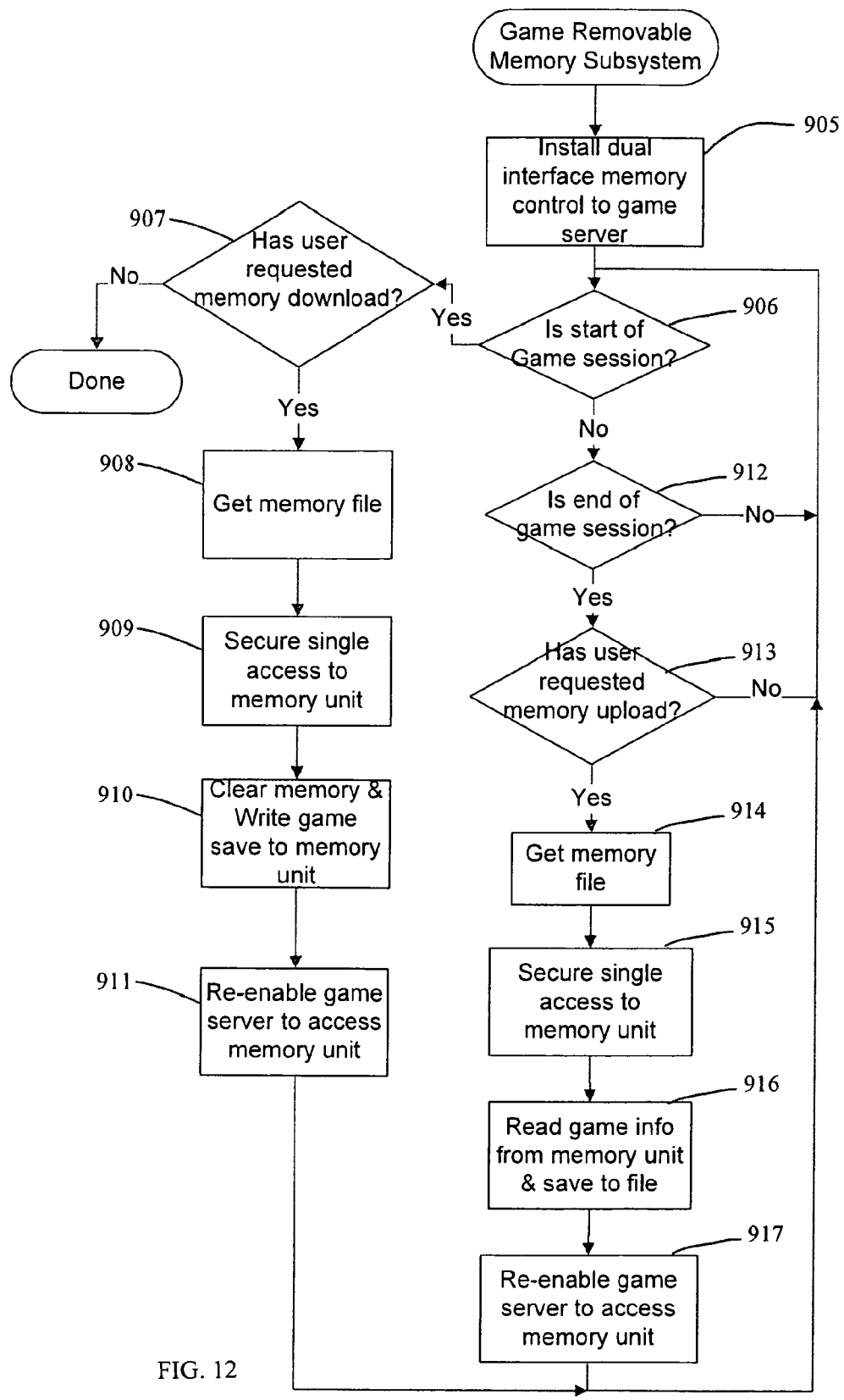
FIG. 12 is a logic flowchart for game removable memory subsystem in one embodiment of the present invention.

Referring to FIG. 12, a logic flowchart for a game removable memory subsystem used in certain embodiments is shown. After installation 905 of a dual interface memory control to the server, a query 906 determines if the game session is starting. If the game session is starting, a query 907 determines if the user has requested a memory download. If so, an acquisition 908 of the memory file is conducted followed by securing single access 909 to the memory unit. This is followed by a clearing 910 of memory and a re-enablement 911 of the game server to access the memory unit. In certain embodiments, the memory transfer between the RCC 310 and the global servers can be accomplished automatically.

If the game session is not starting, a query 912 is performed to determine if the game session is ending. If so, another query 913 determines whether the user has requested a memory upload. If the user has requested a memory upload, an acquisition 914 of the memory file is conducted, followed by a securement 915 of single access to the memory unit. This is in turn followed by a reading 916 of game info from the memory unit and a re-enablement 917 of the game server to access the memory unit.

With the benefit of the present disclosure, those having ordinary skill in the art will comprehend that the embodiments described herein may be modified and applied to a number of additional, different applications, achieving the same or a similar result.

What is claimed is:
1. A networked game system comprising:
a network interface configured to receive packetized information from a packet network;
a console server system comprising a console virtualization engine, including an audio and video encoder and a memory emulator, and a memory emulation unit, the console server system including a processor, the console server system configured to perform operations comprising:
receiving a first game selection of a first electronic game by the user;
providing the user with access to a first of a plurality of game consoles coupled to the console server system to play the first electronic game with the user;
establishing a first game session with the first game console;
receiving via the network interface a packetized game controller signal from a remote game controller;
converting the received packetized game controller signal to a corresponding controller input signal compatible with a game controller input of the first game console;
communicating the converted game controller signal to the first game console;
receiving audio and video data output from the first game console;
encoding and packetizing the audio and video output from the first game console;
transmitting over the packet network to a client associated with the user, at least a portion of the encoded and packetized audio and video data;
determining if the first game session with the first game console is ending;
uploading a game configuration corresponding to the first game session with the first game console to a repository;

determining if a second game session is initiated by the user;

downloading the uploaded game configuration from the repository to a second game console different than the first game console to preserve continuity of game play from the first game session with the first game console to the second game session with the second game console with respect to the first electronic game.

2. The networked game system as defined in claim 1, wherein downloading the uploaded game configuration from the repository to the second game console is preformed based at least in part in response to a user response to a query relating to whether the user wants the game configuration corresponding to the first game session to be accessed by the second game console.

3. The networked game system as defined in claim 1, the operations further comprising preventing further access to the game configuration uploaded from the first game console to the repository after the game configuration has been downloaded to the second game console.

4. The networked game system as defined in claim 1, the operations further comprising querying the user as to whether the user wants the game configuration corresponding to the first game session stored in the repository.

5. The networked game system as defined in claim 1, wherein the client comprises a personal computer, a mobile computer, a handheld device, or a television set top box, wherein the client is remote from the first game console and is connected to the first game console via the packetized network and the remote game controller generates a game controller signal configured to be interpreted as a game controller function, the console server system further comprising an input, separate from the game controller input of the first game console, configured to receive an audio signal.

6. The networked game system as defined in claim 1, wherein the first game console comprises a standard computer configured to perform a plurality of functions in addition to enabling the user to play games.

7. A method for enabling a user to remotely play an electronic game, the method comprising:

receiving at a first networked game system a first game selection of a first electronic game by the user;

providing, by the first networked game system, the user with access to a first of a plurality of game consoles coupled to a console server system to play the first electronic game with the user;

establishing a first game session with the first game console;

receiving at the first networked game system a packetized game controller signal from a remote game controller;

converting the received packetized game controller signal to a corresponding controller input signal compatible with a game controller input of the first game console;

communicating the converted game controller signal to the first game console;

receiving audio and video data output from the first game console;

encoding and packetizing the audio and video output from the first game console;

transmitting over the packet network to a client associated with the user, at least a portion of the encoded and packetized audio and video data;

determining if the first game session with the first game console is ending;

uploading a game configuration corresponding to the first game session with the first game console to a repository;

determining if a second game session is initiated by the user;

downloading the uploaded game configuration from the repository to a second game console different than the first game console to preserve continuity of game play from the first game session with the first game console to the second game session with the second game console with respect to the first electronic game.

8. The method as defined in claim 7, wherein downloading the uploaded game configuration from the repository to the second game console is preformed based at least in part in response to a user response to a query relating to whether the user wants the game configuration corresponding to the first game session to be accessed by the second game console.

9. The method as defined in claim 7, the method further comprising preventing further access to the game configuration uploaded from the first game console to the repository after the game configuration has been downloaded to the second game console.

10. The method as defined in claim 7, the method further comprising querying the user as to whether the user wants the game configuration corresponding to the first game session stored in the repository.

11. The method as defined in claim 7, wherein the client comprises a personal computer, a mobile computer, a handheld device, or a television set top box, wherein the client is remote from the first game console and is connected to the first game console via the packetized network and the remote game controller generates a game controller signal configured to be interpreted as a game controller function, the console server system further comprising an input, separate from the game controller input of the first game console, configured to receive an audio signal.

12. The method as defined in claim 7, wherein the first game console comprises a standard computer configured to perform a plurality of functions in addition to enabling the user to play games.

13. A non-transitory storage medium storing program code that when executed by a computing system is configured cause the computer system to perform operations comprising:

receiving a first game selection of a first electronic game by the user;

providing the user with access to a first of a plurality of game consoles coupled to a console server system to play the first electronic game with the user;

establishing a first game session with the first game console;

receiving a packetized game controller signal from a remote game controller;

converting the received packetized game controller signal to a corresponding controller input signal compatible with a game controller input of the first game console;

communicating the converted game controller signal to the first game console;

receiving audio and video data output from the first game console;

encoding and packetizing the audio and video output from the first game console;

transmitting to a client associated with the user, at least a portion of the encoded and packetized audio and video data;

determining if the first game session with the first game console is ending;

uploading a game configuration corresponding to the first game session with the first game console to a repository;

determining if a second game session is initiated by the user;

downloading the uploaded game configuration from the repository to a second game console different than the first game console to preserve continuity of game play from the first game session with the first game console to the second game session with the second game console with respect to the first electronic game.

14. The non-transitory storage medium as defined in claim 13, wherein downloading the uploaded game configuration from the repository to the second game console is preformed based at least in part in response to a user response to a query relating to whether the user wants the game configuration corresponding to the first game session to be accessed by the second game console.

15. The non-transitory storage medium as defined in claim 13, the operations further comprising preventing further access to the game configuration uploaded from the first game console to the repository after the game configuration has been downloaded to the second game console.

16. The non-transitory storage medium as defined in claim 13, the operations further comprising querying the user as to whether the user wants the game configuration corresponding to the first game session stored in the repository.

17. The non-transitory storage medium as defined in claim 13, wherein the client comprises a personal computer, a mobile computer, a handheld device, or a television set top box, wherein the client is remote from the first game console and the remote game controller generates a game controller signal configured to be interpreted as a game controller function, and the console server system an input, separate from the game controller input of the first game console, configured to receive an audio signal.

18. The non-transitory storage medium as defined in claim 13, wherein the first game console comprises a standard computer configured to perform a plurality of functions in addition to enabling the user to play games.

* * * * *